United States Patent
Miyama et al.

[11] Patent Number: 5,476,626
[45] Date of Patent: Dec. 19, 1995

[54] METHOD FOR FORMING A WEATHERSTRIP

[75] Inventors: Masayoshi Miyama; Hiroshi Togami, both of Chiba, Japan

[73] Assignee: Kinugawa Rubber Ind. Co., Ltd., Chiba, Japan

[21] Appl. No.: 964,825

[22] Filed: Oct. 22, 1992

[30] Foreign Application Priority Data

Feb. 28, 1992 [JP] Japan ................................ 4-043181

[51] Int. Cl.$^6$ .................................................. B29C 47/04
[52] U.S. Cl. ........................ 264/129; 264/134; 264/211; 264/331.13; 264/331; 264/19; 425/131.1
[58] Field of Search .................... 264/129, 131, 264/134, 135, 171, 176.1, 331.13, 331.19, 211; 425/131.1

[56] References Cited

U.S. PATENT DOCUMENTS

| | | | |
|---|---|---|---|
| 4,209,596 | 6/1980 | Hashimoto et al. | 525/340 |
| 4,244,843 | 1/1981 | Hashimoto et al. | 525/211 |
| 4,335,227 | 6/1982 | Bender et al. | 525/377 |
| 4,622,712 | 11/1986 | Sugita et al. | 264/340 |
| 4,656,094 | 4/1987 | Kojima et al. | 264/176.1 |
| 4,698,193 | 10/1987 | Bernitz et al. | 264/257 |
| 4,849,045 | 7/1989 | Schmidt | 264/177.2 |
| 4,849,468 | 7/1989 | Murachi et al. | 525/215 |
| 5,112,548 | 5/1992 | Roberts et al. | 425/131.1 |
| 5,154,839 | 10/1992 | Hanano | 106/38.22 |
| 5,183,613 | 2/1993 | Edwards | 264/177.1 |
| 5,267,846 | 12/1993 | Miyama et al. | 264/171 |

FOREIGN PATENT DOCUMENTS

| | | |
|---|---|---|
| 4109178 | 9/1991 | Germany . |
| 62-244634 | 10/1987 | Japan . |

*Primary Examiner*—Jay H. Woo
*Assistant Examiner*—Duane S. Smith
*Attorney, Agent, or Firm*—Bachman & LaPointe

[57] ABSTRACT

A method for forming a weatherstrip includes extruding a compound formed of 1–10 weight of polyglycidyl methacrylate having an epoxy group in the molecular structure thereof added per 100 parts of a rubber compound formed of SBR/EPDM. As the compound is extruded from the extruder, a urethane coating material is supplied to a nozzle to accomplish coating of an article concurrently with forming thereof. The extruded article is then vulcanized to assure good sealability.

14 Claims, 2 Drawing Sheets

METHOD FOR FORMING A WEATHERSTRIP

BACKGROUND OF THE INVENTION

1. Field of The Invention

The present invention relates generally to a weatherstrip. Particularly, the present invention relates to a weatherstrip which has a portion for making sliding contact with another article, such as a glass window.

2. Description of The Prior Art

Various types of weatherstrip for sealing around doorways, windows, etc., are well known in the art. Usually such conventional weatherstrips are formed by extrusion molding or the like. One such process is described in Japanese Patent Application (First Publication - unexamined) No. 3-161329. This publication discloses a process for forming a weatherstrip including a glass run for making sliding contact, with a window of an automotive vehicle for example. According to the process of the disclosure, an adhesive layer is formed of a compound of nitryl rubber (NBR)/ethylenepropylene rubber (EPDM), on a glass sliding portion of a glass run body formed of EPDM. An extruder for extruding the glass run and another extruder for extruding the adhesive layer are connected to a polychromatic extrusion head, then the glass run and the adhesive layer are extruded concurrently. The surface of the slide portion (the adhesive layer) of the article extruded in this manner is coated with a urethane coating material by known methods, such a flow coating or brushing. The article is thereafter vulcanized.

However, according to the above mentioned process, manufacturing equipment costs are increased as separate extruders are used for extrusion of the glass run portion and for the adhesive layer of the slide portion. In addition, since the urethane coating material is supplied by common processes after extrusion, when a glass run of complex cross-section, such as section "a" of FIG. 4, is to be formed, effective coating of all portions thereof cannot be assured, particularly on such as the fine raised portions projected from the surface of the article.

SUMMARY OF THE INVENTION

It is therefore a principal object of the present invention to overcome the drawbacks of the prior art.

It is a further object of the present invention to provide a process for producing a weatherstrip via a single extruder and to facilitate application of a coating material for an article to be extruded such that coating can be efficiently carried out even for articles having complex shapes.

In order to accomplish the aforementioned and other objects, a method of forming a weatherstrip is provided, comprising the steps of: adding polyglycydyl methacrylate having an epoxy group to a rubber compound, extruding the rubber compound, supplying a urethane coating material to a nozzle arranged at an outlet portion of an extruder extruding the rubber compound, coating a surface of the rubber compound with the urethane coating material via the nozzle, and vulcanizing the rubber compound coated with the urethane coating material.

DESCRIPTION OF THE PREFERRED EMBODIMENTS

Figure 1:
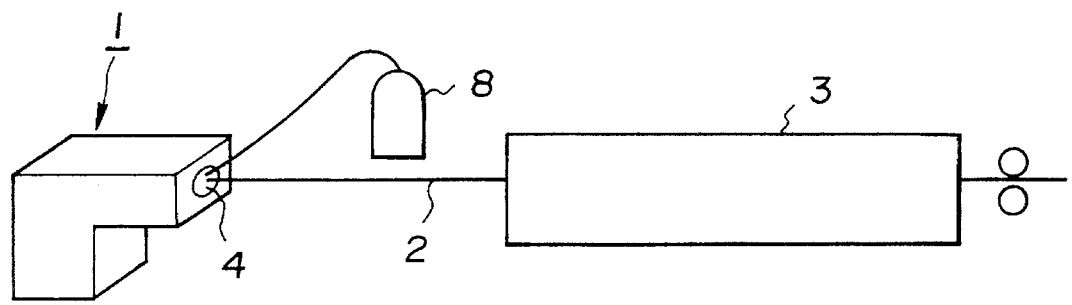
FIG. 1 is a schematic diagram of system for carrying out the method of the invention according to a first embodiment thereof.

Referring now to the drawings, particularly to FIG. 1, a system for carrying out the method of the invention is shown. As seen in the drawing, a rubber compound is extruded from an extruder 1 to form an article 2 which is then supplied to a vulcanizing sump 3 for vulcanization.

According to the present embodiment, the rubber compound is prepared by adding 1–10 parts of polyglycydyl methacrylate, having a epoxy group in the molecular structure thereof, per 100 parts of a rubber compound comprised of a mixture of styrene butadiene rubber (SBR), and EPDM, mixed in a ratio from 80/20 to 30/70. As the obtained compound is extruded from the extruder 1 a urethane coating material without solvent, or containing less than 20% of a solvent having a boiling point of at least 150° C., is supplied to a nozzle 4 which is arranged at an edge portion of the extruder 1. Coating of the extruded article 2 with the urethane coating material is thus accomplished concurrently with extrusion. The urethane coating material is then hardened in a vulcanizing step to form a urethane unguent layer on the glass run portion of the weatherstrip. Polyglycydyl methacrylate having an epoxy group added to the rubber compound increases sealability between the rubber compound and the urethane coating material through interaction between the coating material and the epoxy group.

Figure 2A:
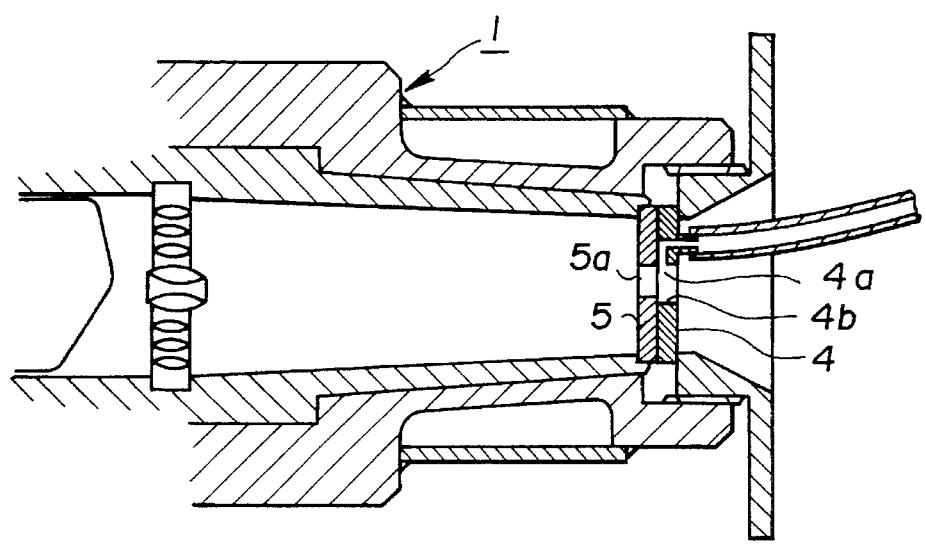
FIG. 2A is a cross-sectional view of an extruder according to one embodiment of the present invention.
Figure 2B:
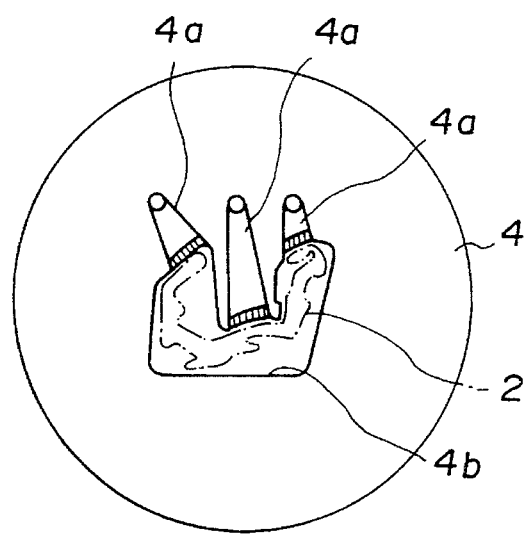
FIG. 2B is a front view of a nozzle of the extruder of FIG. 2A.

Referring to FIG. 2A, the nozzle 4 is attached at an outer side of an inner nozzle 5 of the extruder 1. A clearance 4a for supplying the coating material is formed in the nozzle 4. Concurrently with extrusion of the rubber compound, the urethane coating material is supplied to the surface of the article 2 via the clearance 4a after it has passed through an opening 5a of the inner nozzle and as it passes through an opening 4b of the outer nozzle 4. As seen in FIG. 1, a coating material supply source 8 is provided for supplying an appropriate amount of the urethane coating material to the clearance 4a of the nozzle 4. As may be seen in FIG. 2B, a plurality of clearances 4a may be provided to supply the coating material to different parts of the article to be coated.

Composition of the rubber compound for embodiments 1–5 of the invention was based on a reference material comprising the following elements:

| | |
|---|---|
| SBR | 70 parts by weight |
| EPDM | 30 parts by weight |
| Zinc oxide | 5 parts by weight |
| Stearic acid | 2 parts by weight |
| CaO | 5 parts by weight |
| FEF carbon | 70 parts by weight |
| Potassium bicarbonate | 30 parts by weight |
| Paraffin oil | 30 parts by weight |
| Sulfur | 1.5 parts by weight |
| Vulcanization accelerator | 4 parts by weight |

The sealability of the reference material was determined at 0.3 Kg/cm, interface peeling occurred on the urethane unguent layer formed on an article formed of the reference material.

Figure 3:
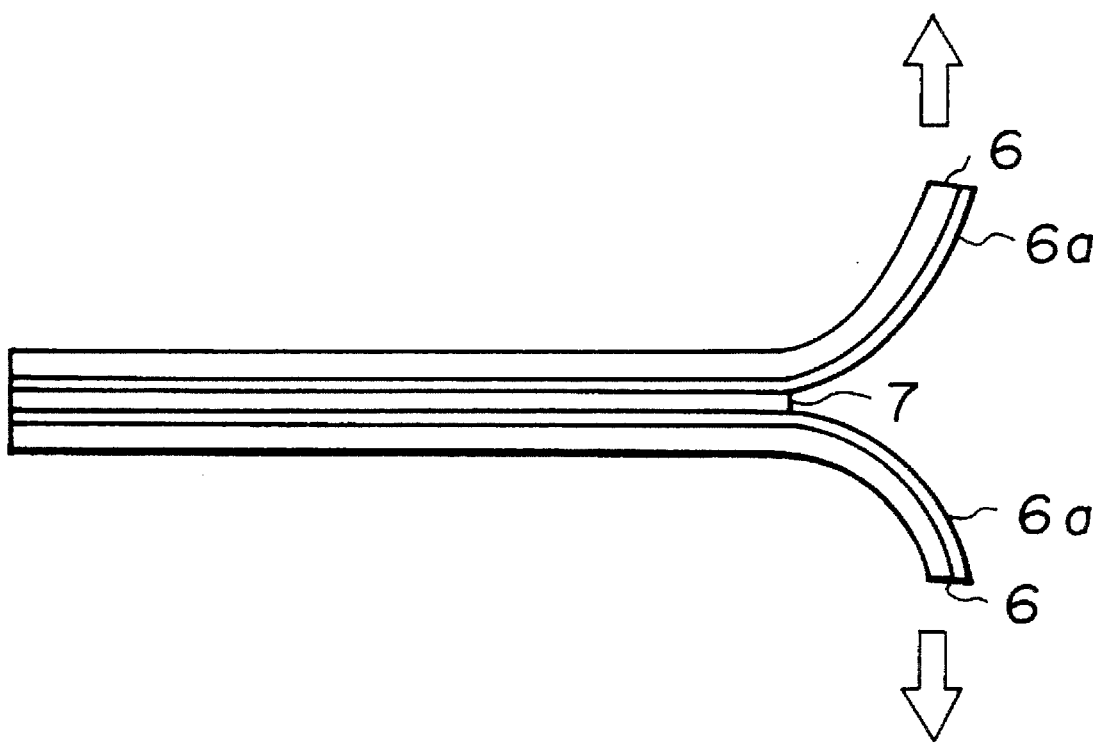
FIG. 3 is a side view of an extruded article for demonstrating a tensile test.
Figure 4:
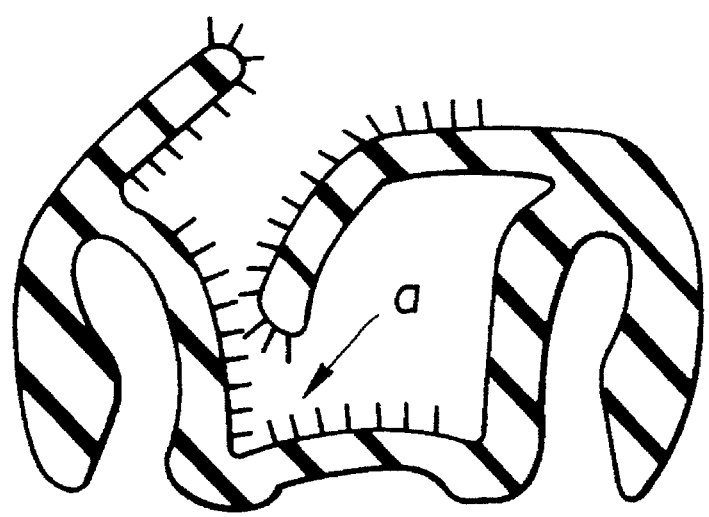
FIG. 4 is a cross-sectional view of a glass run.

Referring to FIG. 3, measurement of sealability was accomplished by preparing two samples 6 of vulcanized reference material 5 mm×100 mm in size. Urethane unguent layers 6a were then laminated to the samples 6 using a momentary adhesive using a Tensilon type tensile test machine. Polyglycydyl methacrylate including an epoxy group was added to the reference material for forming first, second, third, fourth, and fifth embodiments having 1, 3, 5, 7, and 10 parts per 100 parts by weight of the above rubber compound of polyglycydyl methacrylate respectively. The obtained results are shown in Table 1.

TABLE 1

| (embodiments) | REF | 1st | 2nd | 3rd | 4th | 5th |
| --- | --- | --- | --- | --- | --- | --- |
| Amount of polyglycidyl methacrylate parts per 100 parts by weight of rubber compound | 0 | 1 | 3 | 5 | 7 | 10 |
| Sealability (Kg/cm) | 0.3 * | 0.7 ** | 1.2 *** | 1.2 *** | 1.2 *** | 1.2 *** |

*: interface peeling occurred
**: base material partially broken
***: base material broken As clearly seen in Table 1, according to addition of polyglycydyl methacrylate interface peeling is prevented. During tensile testing, the base material was completely or partially ruptured while the interface integrity was preserved. Therefore, as shown by the tests, sealability can be improved by addition of 1 part per 100 parts by weight of the above rubber compound of polyglycydyl methacrylate, however, the obtained degree of sealability is not sufficient. On the other hand, when adding more than 10 parts per 100 parts by weight of the above rubber compound of polyglycydyl methacrylate, the added polyglycydyl methacrylate reacts with a vulcanization accelerating substance causing vulcanization speed to be reduced and reduces a tearing strength of the article by 10%.

Preparation of the urethane coating material without solvent (urethane blending):

The most preferable urethane coating material is composed of two solutions, i.e., a polyol component having an OH group at an end thereof, and an isocyanate component. However, it is also possible to advantageously utilize one solution type coating material, produced by blending block type isocyanate with a polyol component. 5 to 60 parts per 100 parts of the polyol component of demethylsilicon oil (having 10,000 to 300,000 CPS of viscosity) is added as a liquid lubricant. In addition, 5 to 50 parts per 100 parts of the polyol component of fluorine containing resin powder (having a particle size of 20 to 100 μm), and particles of molybdenum disulfide, nylon, polyethylene or such like, are added as a solid lubricant.

Urethane coating material without solvent is desirable for effecting the process of the invention, however, if necessary, a solvent having a boiling point of at least 150° C. may be added when the viscosity of the coating material exceeds 300,000 CPS in order to assure even coating. An amount of solvent added to the coating material is regulated to less than 20%. If 20% or more of solvent is added to the coating material, the coating layer may be foamed by heat generated at the vulcanizing sump, degrading the appearance and wear resistance of the article. Further, if solvent having a boiling point lower than 150° C. is utilized, the coating layer will foam even is only small amounts of solvent are used.

Composition of a test sample of a urethane coating material:

Polyol PU-5106 (Toa synthetic chemical Co., Ltd.) 100 parts

Isocyanate PU-1300 (Toa synthetic chemical Co., Ltd.) 100 parts per 100 parts of the polyol component Fluorine powder L180J (30 μm) (Asahi glass Co., Ltd.) 10 parts per 100 parts of the polyol component Silicon oil TSF451-10M (Toshiba silicon Co., Ltd.) 10 parts per 100 parts of the polyol component Viscosity of the above coating material was 100,000 CPS.

1. Wear resistance test:

Wear resistance testing was carried out on test samples having a coating layer thickness of 100 mm. Testing was accomplished by a constant load wear tester on which a glass abrader (having 5 mm thickness) was mounted; with 3 Kg of load, at 30 cycle/min., and with a 50 mm stroke. The obtained results are shown in Table 2.

TABLE 2

|  | Standard | Result |
| --- | --- | --- |
| Normal Condition | 5,000 times | 20,000 times* |
| Mud addition | 1,500 times | 10,000 times** |

*rubber surface was not exposed
**rubber surface was exposed

As can be seen, under normal conditions, even when subjected to four times the testing standard, the coating surface of the invention shows wear resistance such that the rubber base material was not exposed. Further, when tested using muddy water, for simulating actual use conditions for a weatherstrip, the material of the invention was subjected to more than six times the testing standard before the rubber base material was exposed. Therefore, it is plainly seen that the coating material of the invention exhibits superior wear resistance.

Coefficient of Dynamic Friction

The dynamic friction coefficient of the coating material of the invention was measured by a HEIDON-14D friction coefficient measuring system (by Shinto Chemical Industries).

Fricter: glass

Load: 100 g

Speed: 1000 mm/minute

Result

The dynamic friction coefficient of the coating material of the invention was found to be 0.15.

As can be seen the method of the invention may provide a weatherstrip including a glass run portion, having optimal characteristics of sealability, wear resistance, and friction coefficience while manufacturing thereof is simplified and manufacturing costs therefor are reduced.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method of forming a weatherstrip, comprising the steps of:

adding polyglycidyl methacrylate having an epoxy group to a rubber compound wherein the polyglycidyl methacrylate is provided by weight at 1 to 10 parts per 100 parts of the rubber compound, said rubber compound being comprised of a mixture of styrene butadiene rubber (SBR), and ethylenepropylene diene copolymer (EPDM), mixed in a ratio from 80:20 to 30:70;

supplying said rubber compound to a first nozzle;

supplying a urethane coating material to a second nozzle communicating with an outlet portion of said first nozzle;

extruding said rubber compound through said first and second nozzles;

supplying said urethane coating material to a surface portion of said rubber compound via said second nozzle during said extrusion of said rubber compound; and vulcanizing said rubber compound with said urethane coating material.

2. A method as set forth in claim 1, wherein 3 to 10 parts of said polyglycidyl methacrylate having an epoxy compound is added per 100 parts by weight of said rubber compound.

3. A method as set forth in claim 1, wherein said rubber compound is comprised of:

| | |
|---|---|
| Styrene butadiene rubber SBR | 70 parts by weight; |
| Ethylene-propylene diene copolymer EPDM | 30 parts by weight; |
| Zinc oxide | 5 parts per 100 parts by weight of said rubber compound; |
| Stearic acid | 2 parts per 100 parts by weight of said rubber compound; |
| CaO | 5 parts per 100 parts by weight of said rubber compound; |
| FEF carbon | 70 parts per 100 parts by weight of said rubber compound; |
| Potassium bicarbonate | 30 parts per 100 parts by weight of said rubber compound; |
| Paraffin oil | 30 parts per 100 parts by weight of said rubber compound; |
| Sulfur | 1.5 parts per 100 parts by weight of said rubber compound; |
| Vulcanization accelerator | 4 parts per 100 parts by weight of said rubber compound. |

4. A method as set forth in claim 1, wherein said urethane coating material is comprised of a polyol component having an OH group at an end thereof, and an isocyanate component.

5. A method as set forth in claim 4, wherein 5 to 60 parts of demethylsilicon oil, having 10,000 to 300,000 CPS of viscosity, is added per 100 parts of said polyol component, as a liquid lubricant.

6. A method as set forth in claim 4, wherein 5 to 50 parts of fluorine containing resin powder having particles from the group consisting of molybdenum disulfide, nylon and polyethylene and a particle size of 20 to 100 μm, are added per 100 parts of said polyol component as a solid lubricant.

7. A method as set forth in claim 1, wherein said urethane coating material is comprised of block type isocyanate with a polyol component.

8. A method as set forth in claim 7, wherein 5 to 60 parts of demethylsilicon oil, having 10,000 to 300,000 CPS of viscosity, is added per 100 parts of said polyol component, as a liquid lubricant.

9. A method as set forth in claim 7, wherein 5 to 50 parts of fluorine containing resin powder having particles from the group consisting of molybdenum disulfide, nylon and polyethylene and a particle size of 20 to 100 μm, are added per 100 parts of said polyol component as a solid lubricant.

10. A method as set forth in claim 1, wherein said urethane coating material includes a solvent having a boiling point of 150° C. or greater in an amount less than 20% of the total volume of said urethane coating material.

11. A method as set forth in claim 10, wherein said solvent is added to said urethane coating material only if a viscosity of the coating material exceeds 300,000 CPS.

12. A method according to claim 1 including the step of supplying said urethane coating material to the surface of said rubber compound after said rubber compound passes through the first nozzle.

13. A method according to claim 12 including the step of supplying said urethane coating material to the surface of said rubber compound as said rubber compound passes through an opening in the second nozzle.

14. A method according to claim 13 including the step of supplying said coating material to different parts of the surface of said rubber compound.

* * * * *